United States Patent
Su

(10) Patent No.: US 7,862,280 B2
(45) Date of Patent: Jan. 4, 2011

(54) SAW TOOTH SCREW

(75) Inventor: Kuo-Tai Su, Kaohsiung (TW)

(73) Assignee: Taiwan Shan Yin International Co., Ltd., Kaohsiung (TW)

( * ) Notice: Subject to any disclaimer, the term of this patent is extended or adjusted under 35 U.S.C. 154(b) by 1143 days.

(21) Appl. No.: 11/467,553

(22) Filed: Aug. 26, 2006

(65) Prior Publication Data

US 2008/0050200 A1    Feb. 28, 2008

(51) Int. Cl.
*F16B 35/04* (2006.01)
(52) U.S. Cl. ..................... 411/411; 411/387.8
(58) Field of Classification Search .............. 411/411, 411/386, 387.2, 387.5, 387.7, 387.8, 412, 411/421
See application file for complete search history.

(56) References Cited

U.S. PATENT DOCUMENTS

| | | | | |
|---|---|---|---|---|
| 2,867,786 A | * | 1/1959 | Doetsch et al. | 439/87 |
| 3,083,609 A | * | 4/1963 | Lovisek | 411/386 |
| 5,044,853 A | * | 9/1991 | Dicke | 411/311 |
| 5,110,245 A | * | 5/1992 | Hiroyuki | 411/421 |
| 2005/0186048 A1 | * | 8/2005 | Dicke | 411/387.4 |

* cited by examiner

*Primary Examiner*—Gary Estremsky
(74) *Attorney, Agent, or Firm*—Banger Shia

(57) ABSTRACT

A saw tooth screw provides a screw thread divided into a first and a second thread sections. A plurality of slots, inclined with respect to a shank axial line, are disposed on each thread of the first thread section for dividing the thread into a plurality of thread segments, wherein each of the thread segment has a first inclined surface and a second inclined surface on two ends thereof; the first inclined surface is parallel to the second inclined surface. The thread of the second thread section is formed of a saw-tooth-shape by having recesses extending from a shank to an outer edge of the thread for debris of object to exit through the slots, thereby reducing the screwing torsion and increasing the screwing rotation speed.

3 Claims, 7 Drawing Sheets

SAW TOOTH SCREW

BACKGROUND OF THE INVENTION

1. Field of the Invention

The present invention relates to a screw, in particular to a screw having the feature of efficient screwing with less torque.

2. Description of the Related Art

Referring to FIGS. 1 and 2, a conventional screw 1 comprises a head 11, a shank 12 extending therefrom and a plurality of threads 13 spirally connected to the shank 12 along the shank axial line "α"; wherein the thread 13 is consisted of an upper flank 131 and an opposite bottom flank 132. A plurality of slots 133 are formed on the thread 13 which divided the thread 13 into thread segments 134 with the first end surface 135 and the second end surface 136. The first end surface 135 and second end surface 136 are parallel to the shank axial line "α". While screwing the screw 1, the first end surface 135 cuts the object 10 to bring in the screw 1. The first end surface 135 is unable to cut the fibers of object 10 efficiently in rotation of the screw 1, which results in fibers entwined on the shank 12 and hence slows down the screwing speed.

Referring to FIG. 3, another conventional screw 2 comprises a head 21, a shank 22 extending therefrom, and a plurality of threads 23 spirally connected to the shank 22 along the shank axial line "α"; wherein a plurality of slots 231 are widely opened and formed on the threads 23 to define a first end surface 232, a second end surface 233 and a third end surface 234. As shown in FIG. 4, during the operation, the slots 231 have a large space to receive a great amount of fibers from the object 20 to increase the tightness of screw 2. Nevertheless, the first end surface 232 is not able to cut up the fiber of the object 20 directly, making wood fiber to quickly gather around said shank 12, which increases screwing friction, and the decreases screwing speed.

SUMMARY OF THE INVENTION

Therefore, the present invention is to provide a screw with the features of high-speed, less torsion and better performance in guiding debris out of the drilling hole of the screw.

The present invention relates to a screw that comprises a head, a plurality of threads spirally connected to the shank along the shank axial line. Wherein, the threads are distributed over the first and the second thread sections. Furthermore, each thread of the first thread section has a plurality of slots defined thereon, which divides the thread into thread segments, each thread segment has a first inclined surface and a second inclined surface on the two ends thereof, the first inclined surface is parallel and inclined to the second inclined surface. The thread at the second thread section is formed of a saw tooth-shape by having recesses extending from the shank to an outer edge of the thread, for debris of object to exit through the slots, thereby reducing the screwing torsion and increasing the screwing rotation speed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
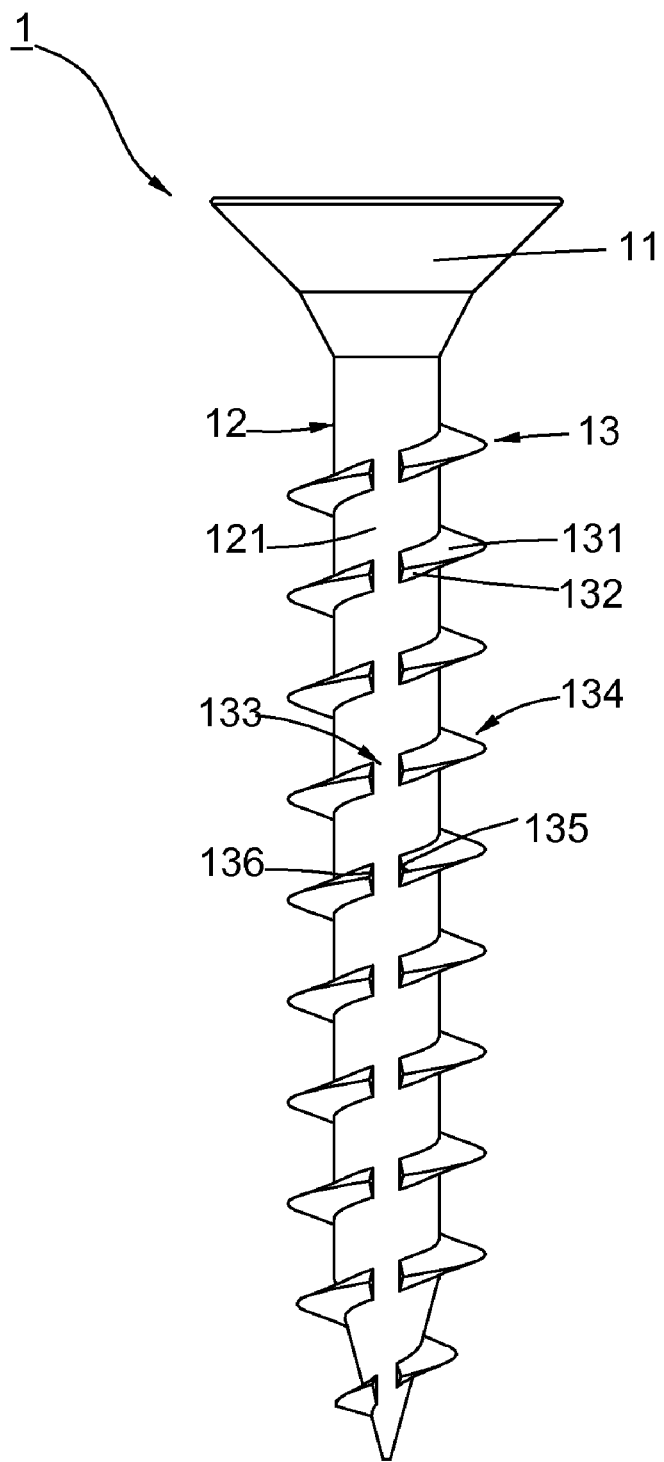
FIG. 1 is a perspective diagram to show a conventional screw.
Figure 2:
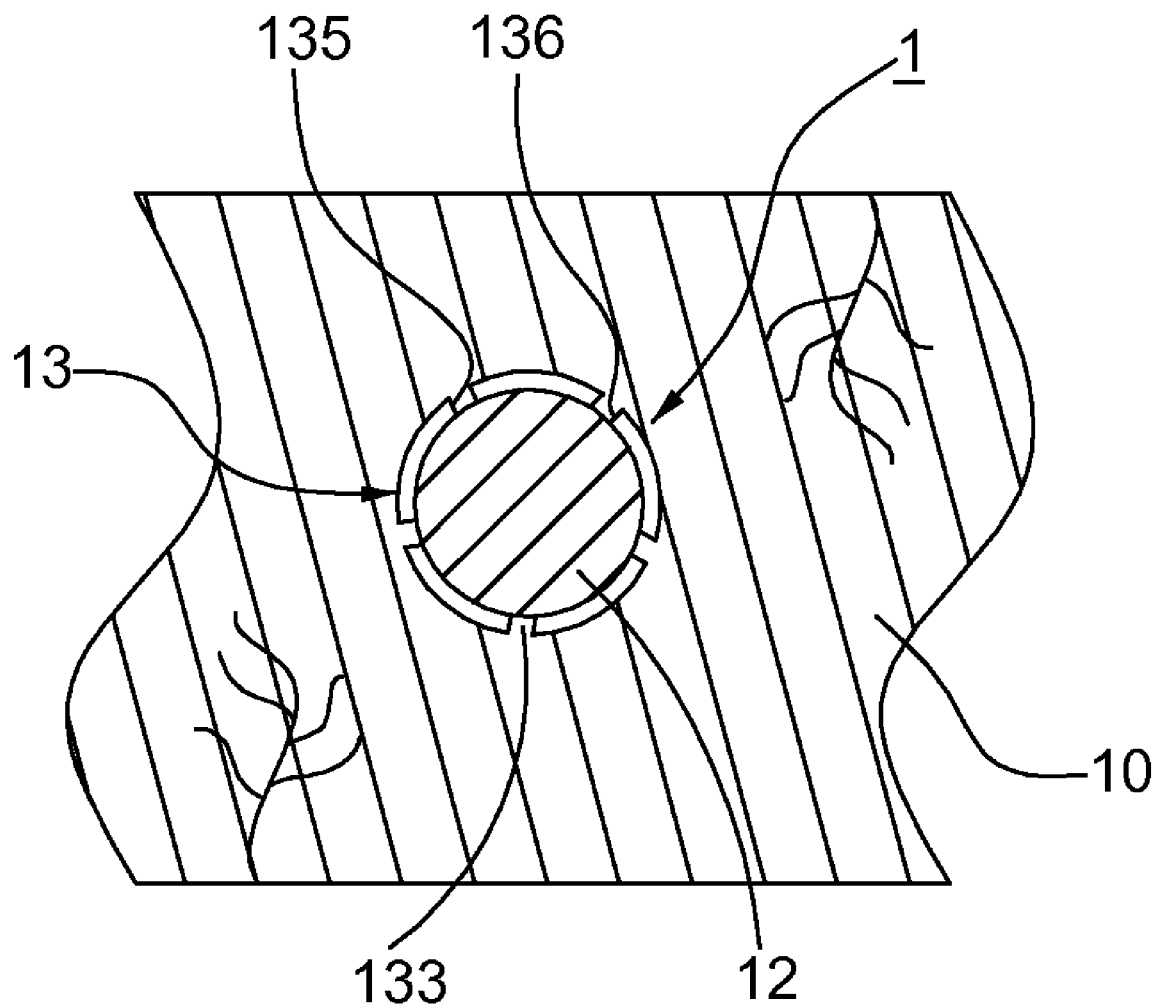
FIG. 2 is a sectional top diagram to show the conventional screw engaged in object.
Figure 3:
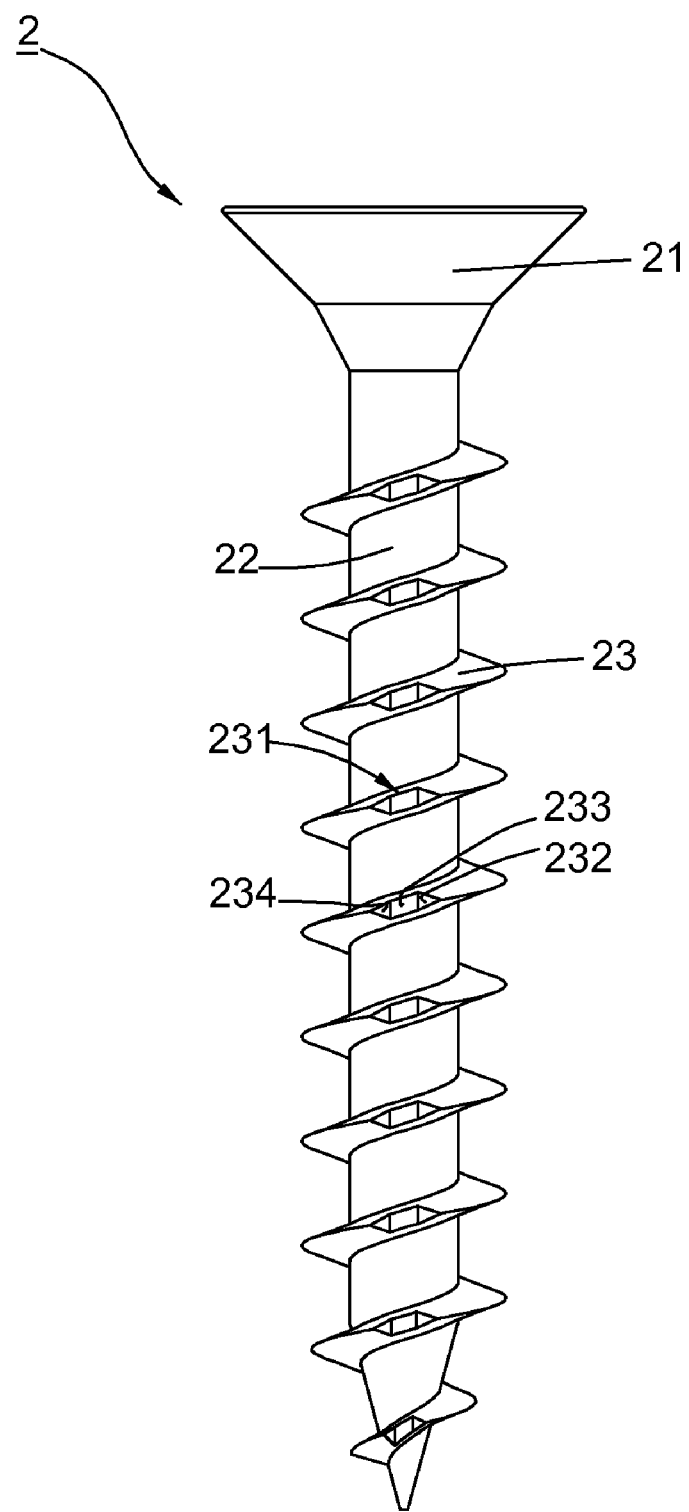
FIG. 3 is a perspective diagram to show another conventional screw.
Figure 4:
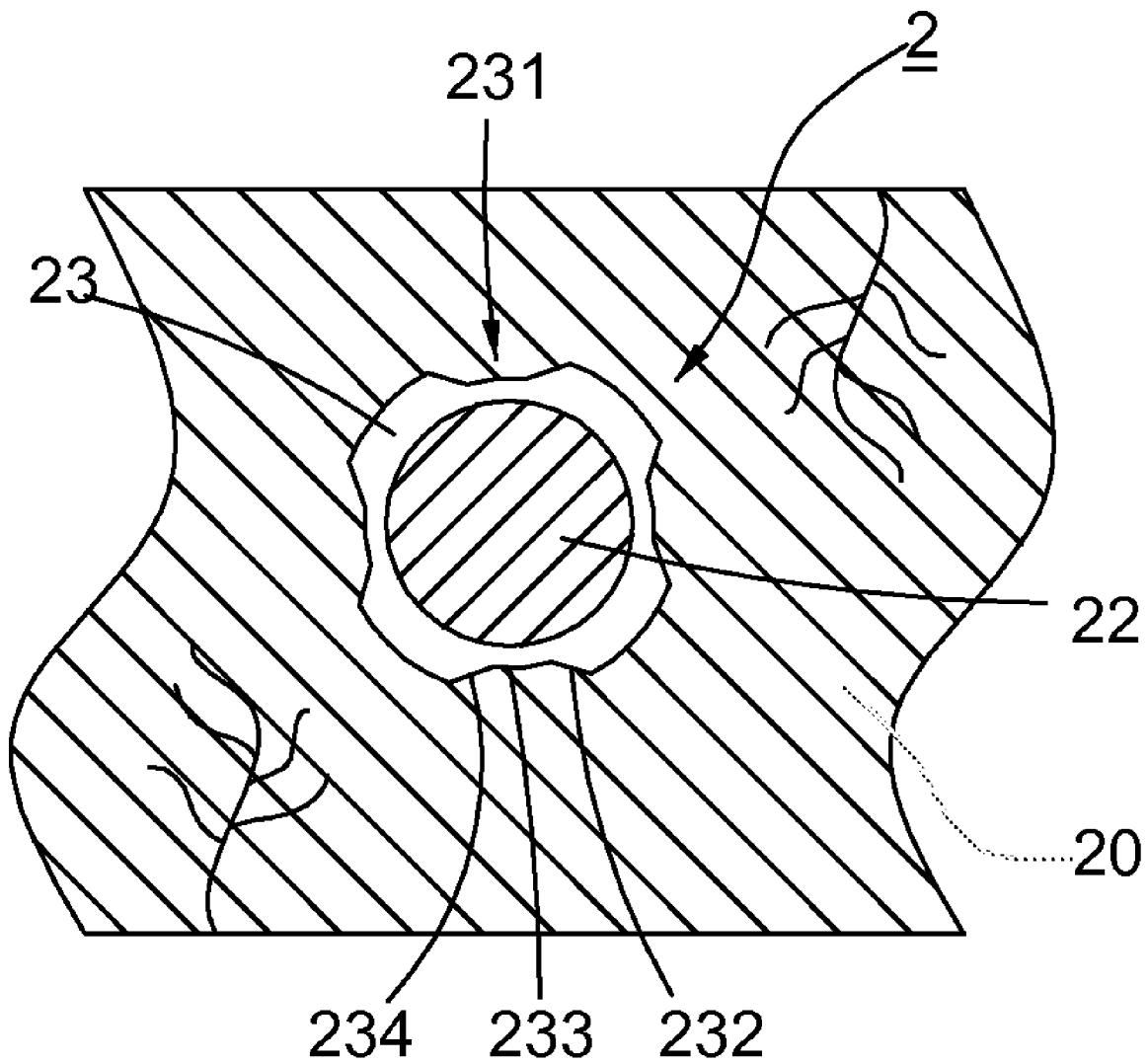
FIG. 4 is a sectional top diagram to show another conventional screw engaged in the object.
Figure 5:
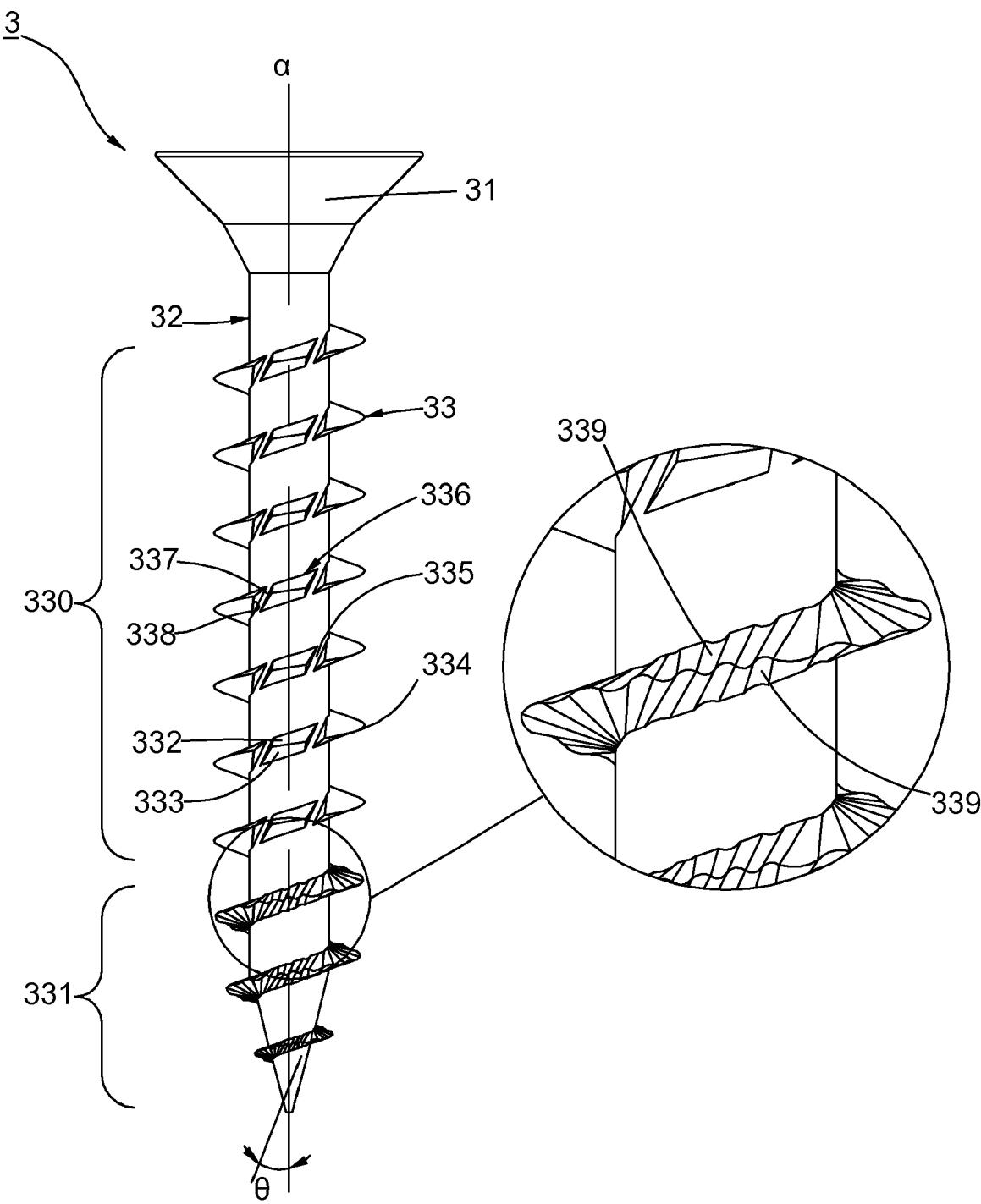
FIG. 5 is a perspective diagram to show the first embodiment of present invention according to the screw.

Referring to FIG. 5, the screw 3 of the present invention comprises a head 31, a shank 32 extending therefrom, and a plurality of thread 33 spirally connected to the shank 32 along the shank axial line "α". Further, the threads 33 occupy the first thread section 330 neighboring the head 31, and the second thread section 331 the first thread section 330 disposed near to the distal end of the shank 32. The thread 33 of the first thread section 330 is consisted of an upper flank 332 and an opposite bottom flank 333. Besides, the upper flank 332 and the opposite bottom flank 333 are connected at an outer edge of the thread 334. Still further, the thread 33 in the first thread section 330 has a plurality of slots 335 formed thereon by enclosing an helix angle "θ" to the shank axial line "α", to divide the first thread section 330 into a plurality of thread segments 336. Each of the thread segments 336 has a first inclined surface 337 and a second inclined surface 338 defined on the two ends of each thread segment 336. The first inclined surface 337 is inclined and distributed over the bottom flank 333, and the second inclined surface 338 is disposed beneath the upper flank 332. In addition, on each thread 33 of the second thread section 331 forms a plurality of recesses 339 defined on the upper flank 332 and the bottom flank 333. Besides, the recesses 339 of the upper flank 332 extend to the opposing bottom flank 333, and the recesses 339 of the bottom flank 333 extend to the opposing upper flank 332, so that the recesses 339 are arranged offset with each other, namely successively continuous with each other, to form an undulated cutting edge 334.

Figure 6:
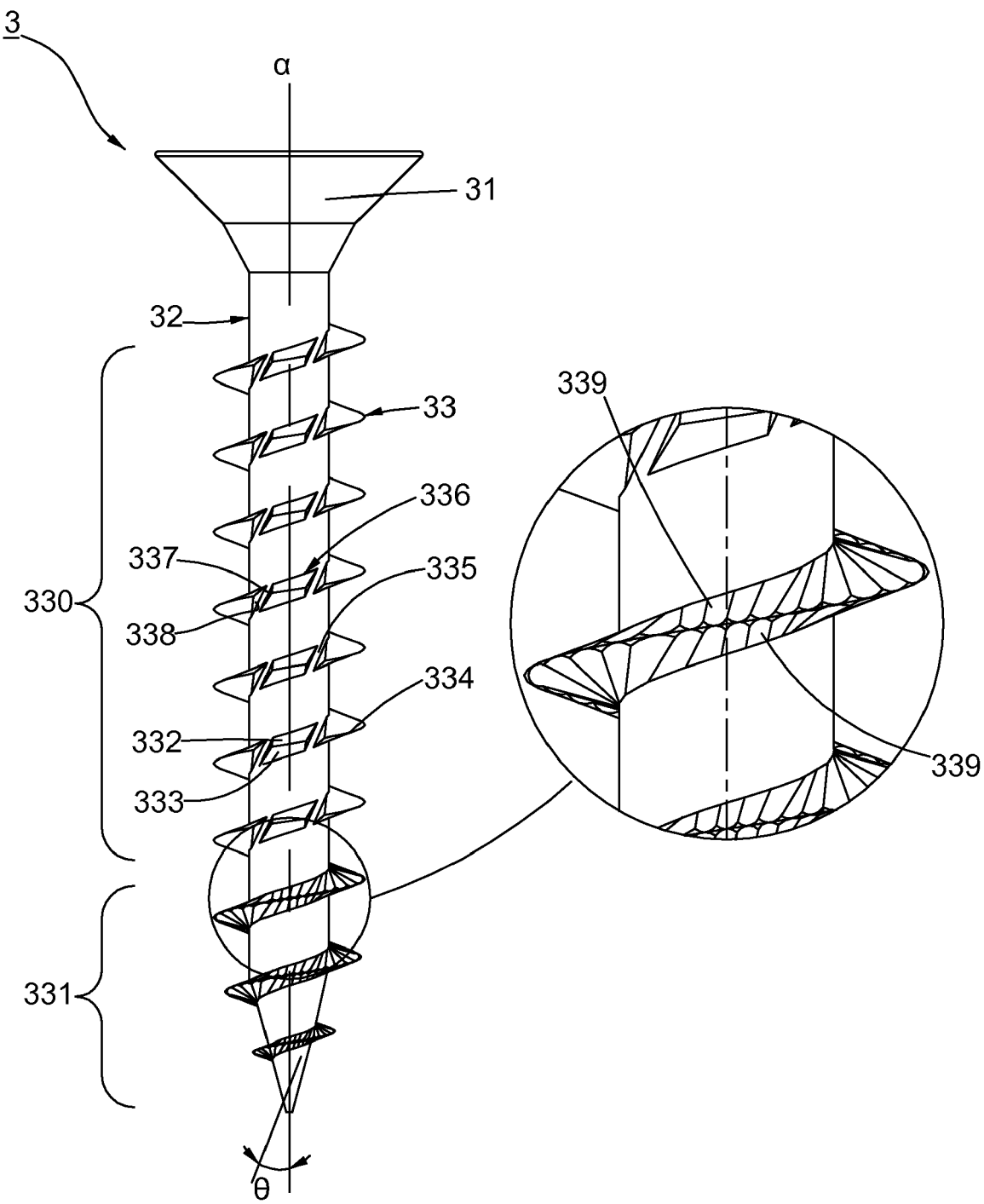
FIG. 6 is a perspective diagram to show the second embodiment of present invention according to the screw.

The said recesses 339 can also be formed as shown in FIG. 6, in which the upper flank 332 and the bottom flank 333 of the second thread section 331 form a plurality -of recesses 339 arranged opposite to each other, wherein the recesses 339 extend to the cutting edge 334 of the preceding flanks, respectively. Although the aforesaid structures are different from the first embodiment, the operation and effects are the same.

Figure 7:
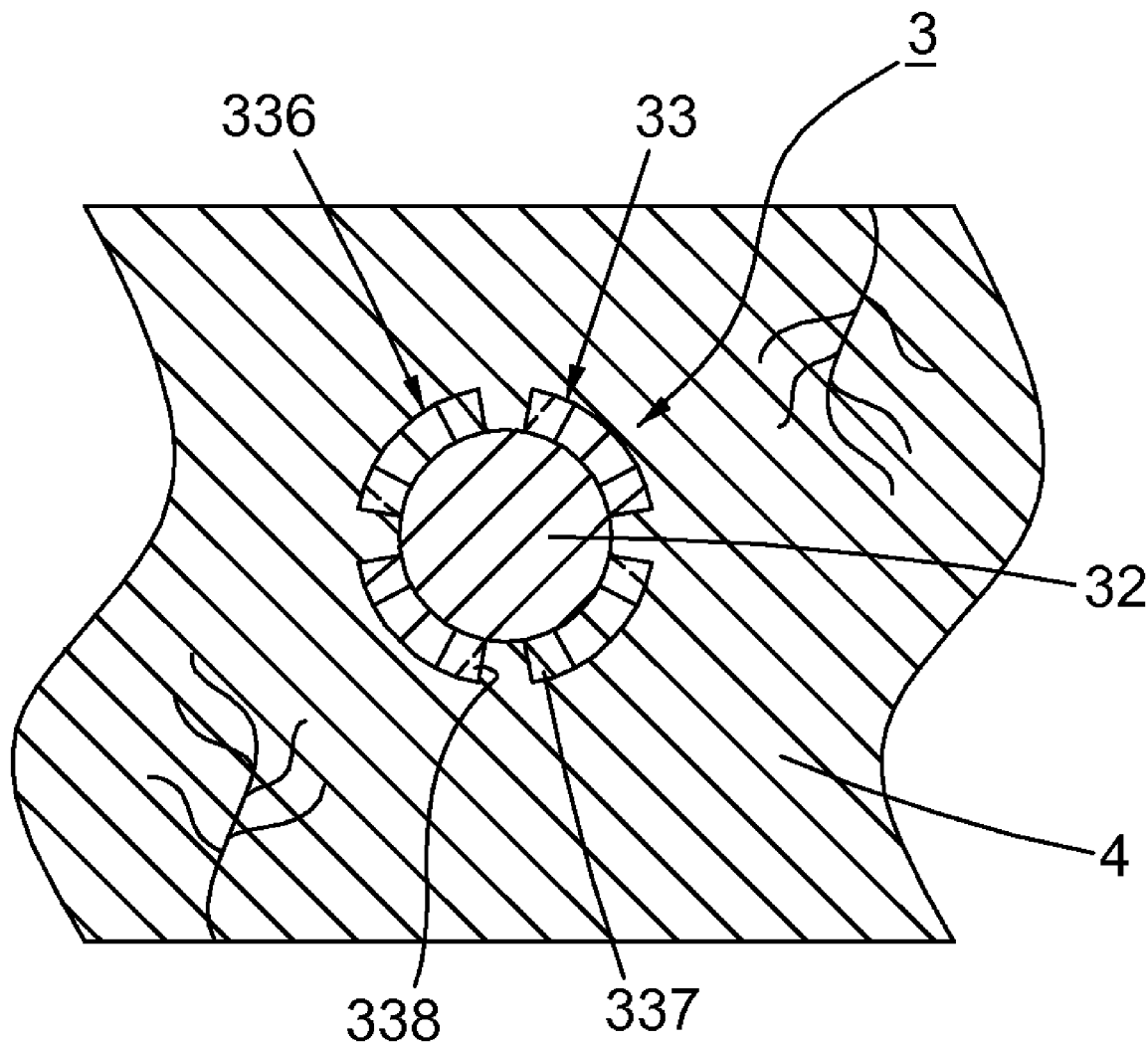
FIG. 7 is a sectional top diagram to show the present invention engaged in the object.

Referring to FIGS. 5 and 7, while screwing the screw 3, with the thread 33 drilling into the object 4 gradually, the cutting edge 334 on the second thread section 331 deformed as saw-tooth-shaped by the recesses 339 cuts the fiber of the object 4 entwined around the shank 32, so as to reduce the screwing resistance.

Subsequently, the second inclined surface 338 of the thread segment 336 facilitates to guide out the fiber of object 4, and benefits the first inclined surface 337 of the adjacent thread segment 336 to sharp cutting the entwined fiber gradually, so as to reduce the screwing torque substantially. Concurrently, the rest of cutting fiber produced during operation can be guided out by the first and the second inclined surfaces 337 and 338, and finally removed from the recesses 339. Still, after screwing the screw, the cutting edge 334 of the second thread section 331, deformed as an undulated or a saw-toothshape, is used to make the screw 3 stably engage in the object 4 and increase the tightness of screw.

To sum up, the present invention uses the cutting edge of the second thread section in the form of a saw-tooth-shaped to cut the fiber of an object, and each thread segment of the first thread section has a first inclined surface and a second inclined surface to efficiently cut up the entwined fiber, reduce the screwing resistance, and enhance the screwing speed and the tightness.

While the above-mentioned of the present invention was clear to those skilled in the art and the further embodiments may be made without departing from the scope of the present invention.

I claim:

1. A saw tooth screw comprising:
   a head;
   a shank with a shank axial line longitudinally extending from said head;
   a first thread section, and
   a second thread section, wherein, said first thread section spirally extends from said head along the shank axial line of said shank to said second thread section;
   each thread of said first and said second thread sections having an upper flank and a lower flank disposed opposing thereto; said thread in said first thread section being interrupted by a plurality of slots inclined with respect to said shank axial line by an angle which divide said thread into thread segments; each of said thread segments having a first inclined surface parallel to a second inclined surface; said thread in said second thread section forming a plurality of recesses depressed on said upper and said lower flanks, which radially extend from said shank to an outer edge of said thread.

2. The screw as claimed in claim 1, wherein said recesses on said upper flank and said bottom flank are arranged offset with each other for forming an undulated cutting edge.

3. The screw as claimed in claim 1, wherein said recesses on said upper flank and said bottom flank are arranged opposing to each other for forming a tooth-shaped cutting edge.

* * * * *